Figure 4:
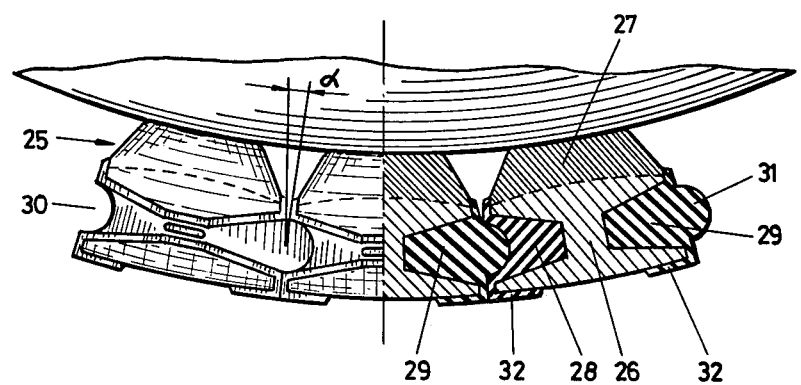

United States Patent [19]

Loggers

[11] 4,134,194
[45] Jan. 16, 1979

[54] SLIDE BEARING

[75] Inventor: Jan N. H. Loggers, Dordrecht, Netherlands

[73] Assignee: Houdstermaatschappij Alex A. Logges B.V., Dordrecht, Netherlands

[21] Appl. No.: 696,623

[22] Filed: Jun. 16, 1976

[30] Foreign Application Priority Data

Jun. 20, 1975 [NL] Netherlands ................. 7507413

[51] Int. Cl.² .......................................... B21D 53/10
[52] U.S. Cl. ................... 29/149.5 R; 308/3.8; 308/3.9; 308/DIG. 4
[58] Field of Search ............ 29/148.4 R, 149.5 R, 29/148.4 C; 308/3.8, 3.9, DIG. .004, 4

[56] References Cited

U.S. PATENT DOCUMENTS

| 2,244,197 | 6/1941 | Hessler | 29/148.4 R |
| 2,639,198 | 5/1953 | Kirkham | 308/4 R |
| 2,683,637 | 7/1954 | Skillman, Jr. | 308/DIG. .004 |
| 2,710,237 | 6/1955 | Smith | 308/4 R X |

Primary Examiner—C. W. Lanham
Assistant Examiner—V. K. Rising

[57] ABSTRACT

A slide bearing and method of making same, in which at least one element of rubber or rubber-like material having projections thereon is introduced into the housing of the bearing with clearance and wherein this clearance is closed and the bearing race connected to the housing, by pressing the projections inwardly into the housing and holding them in expanded condition.

8 Claims, 5 Drawing Figures

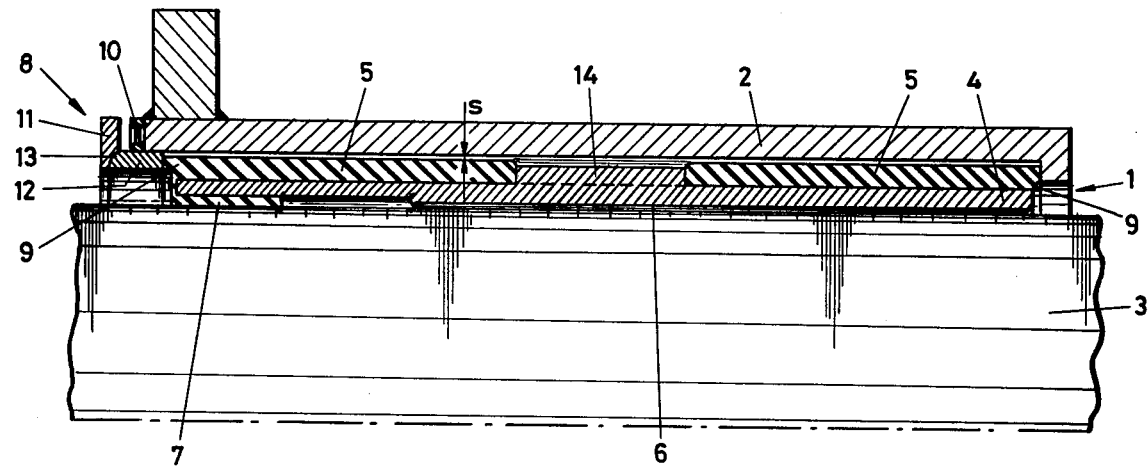
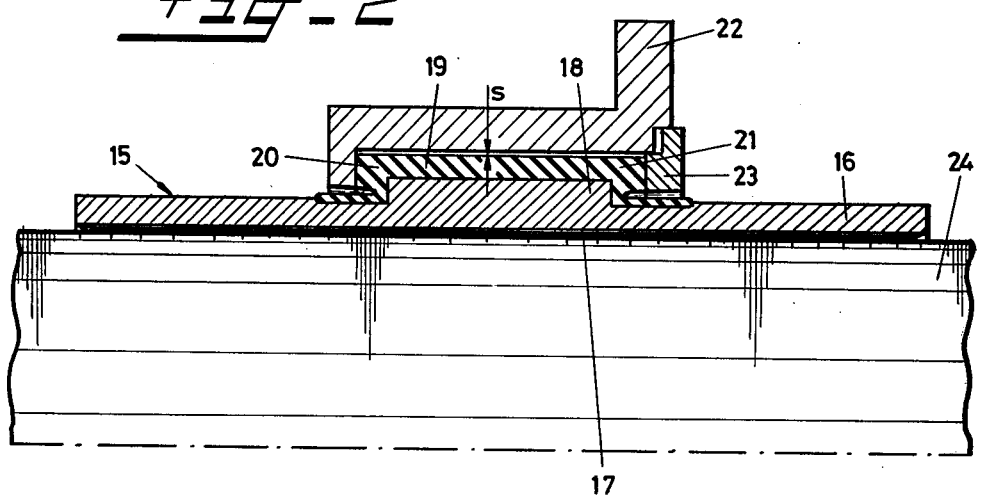
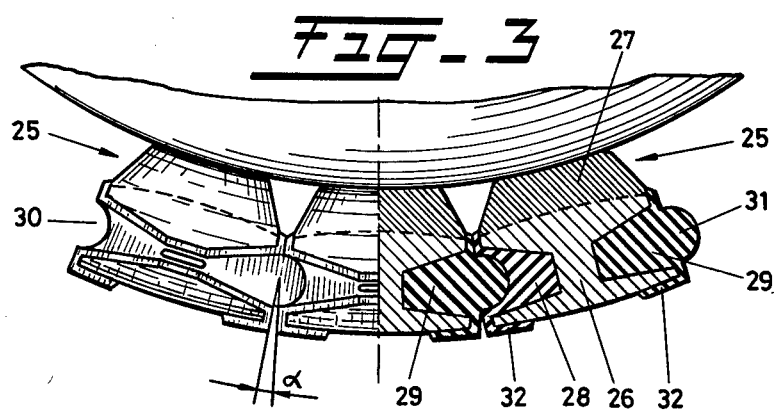

SLIDE BEARING

The invention relates to a method for forming the race of a slide bearing by mounting an element forming the race in the casing of the slide bearing.

Up till now in mounting an element forming the race in the casing of a slide bearing, this element is forced in the bore of the bearing casing.

The disadvantage of this known method is that for forcing the element into the casing and for replacing of the element a press tool or high pressure equipment has to be used.

The object of the invention is to provide a method for mounting an element forming the race in the casing of a slide bearing, in which no press tool or high pressure equipment need to be used.

This object is achieved in that in the method according to the invention the element forming the race is introduced into the casing with a radial clearance and thereupon this clearance is filled up by expanding radially and/or tangentially at least one axial portion of the element made up of rubber or a similar material, by pressing inwardly into the casing projections provided at both ends of the rubber portion with the aid of at least one precompressing ring.

In this manner the property of rubber or a similar material is utilized, that in the first place compression of said material in one direction results into an expansion in a direction perpendicular thereto and that in the second place while compressing rubber or a similar material in a space completely or almost completely closed off, the pressure propogates almost as in a liquid or all-sided, what is called a hydrostatic pressure development.

The element forming the race may be a bush-shaped casing having an outer diameter which is smaller than the inner diameter of the bore of the bearing housing and which in cross-section from the inside outwardly comprises a race, a core of an indeformable material and the rubber portion.

Preferably the casing has an intermediately disposed outwardly projecting ridge.

The rubber portion may comprise this ridge so that the projections are formed by the parts of the rubber portion on either side of the ridge.

The element forming the race may also be built up of a plurality of segments disposed in abutting relationship of which each consists of an indeformable core, a race formed thereupon and rubber parts disposed in recesses in the core at the abutting surfaces and which slightly protrude.

Suitably the rubber parts may have a rounded projection at the one side of each segment and a complementary formed rounded cavity at the other side.

The recesses in each segment may be bounded by one radial surface and one approximately tangential surface, so that the rubber parts in the recesses extend up to the outer surface of the segments.

It is noted that a slide bearing is known of which the race is formed by strips of rubber which are introduced into the bearing housing and then pressed inwardly by means of a retaining ring. Thus in this known slide bearing the race consists always of rubber as it is formed by the inner surfaces of the rubber strips, while in applying these strips first strips are placed in the lower half of the bearing housing, after which the retaining ring is loosely fitted, the shaft to be supported is introduced into the housing, then the strips are inserted in the upper half of the bearing housing and finally the retaining ring is fastened.

Figure 5:
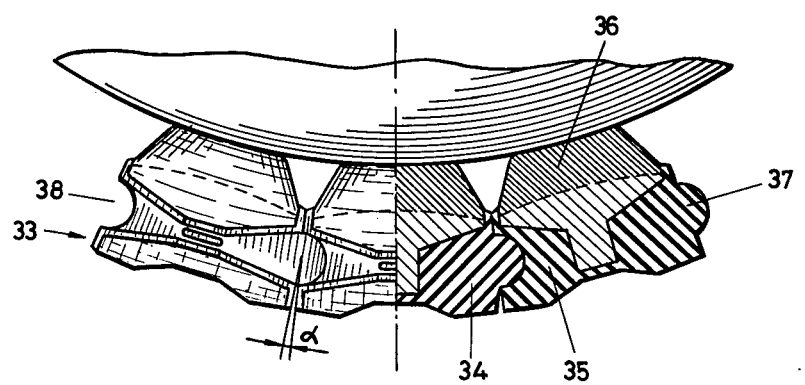

The invention will now be explained in more detail by referring to the drawing in which:

FIG. 1 shows a longitudinal section of a first embodiment of a slide bearing obtained by the invention, FIG. 2 shows a longitudinal section of a second embodiment of a slide bearing obtained according to the invention, FIG. 3 shows in cross-section a part of an element forming the race made up of segments in a slide bearing obtained according to the invention, FIG. 4 shows the same segments as in FIG. 3 in a slide bearing having a larger diameter, and FIG. 5 shows in cross section a part of an element forming the race made up of segments having a different embodiment in a slide bearing according to the invention.

In FIG. 1 an element 1 is mounted in the bearing housing 2 with an axial clearance s. The element 1 is formed by a casing comprising a non-deformable core 4 and a part 5 of rubber or a similar material surrounding said core. At the inner side of the core 4 a race 6 is formed which may consist of any desired material, even of rubber as indicated with reference numeral 7 at the left hand portion of FIG. 1.

When the element 1 is inserted inside the housing 2 as shown in FIG. 1 the precompressing ring 8 is tightened so that the projections 9 at the free ends of the rubber part 5 are pressed inwardly and the clearance s is filled up until sufficient tension on the wall of the housing 2 is achieved to prevent the element 1 from twisting or shifting.

Between the precompressing ring 8 and the housing 2 a spring washer 10 of for instance rubber may be mounted in order to be able to take up possible tolerances in the clearance s as a result of a not entirely exact finish of the bore of the housing.

The precompressing ring 8 may consist of two parts 11 and 12, spherically fitting upon each other at 13. Owing to this it is possible to modify the precompressing force in any desired direction by means of which a not exact axial alignment of the shaft or a so-called inclining of the shaft may be corrected, so that edge pressures may be avoided or reduced. The core 4 of the element 1 may in the middle be provided with a raised ridge 14, by means of which a more equal expansion force upon the wall of the housing may be achieved by radially expanding the rubber 5 by means of the precompressing ring 8.

In the embodiment according to FIG. 2 the element 15 forming the race consists of an indeformable core 16 upon which the race 17 is formed, whilst the core 16 is provided with a ridge 18. However, the rubber portion 19 is mounted about the ridge 18 so that at both sides of the ridge 18 the projections 20 and 21 are formed.

After mounting the element 15 with the clearance s into the housing 22 the precompressing ring 23 again is tightened so that as a result of the axial precompressing force a radial expansion of the rubber 19 occurs and a firm fastening of the element 16 in the housing 22 is achieved.

In this embodiment the element 15 may perform a small swinging movement in the housing 22, by means of which said element may adapt itself to the movements of the shaft 24, with as a result that high edge-pressures in the bearing are avoided.

In the FIGS. 3 and 4 the element forming the race consists of a number of segments 25 being positioned against each other. Each of said segments consists of a indeformable core 26 and a race 27 formed thereupon, which may consist of any desired material. In the core 26 two recesses are formed in which the rubber portions 28 and 29 are inserted. The rubber portions 28 and 29 have a projection at the free ends which by means of a precompressing ring may be pressed in the housing, in the same way as described for the FIGS. 1 and 2. However, as a result of said axial precompressing force a tangential expansion of the rubber portions 28 and 29 occur by means of which a firm fastening of the segments 25 in the housing is achieved, since said tangentially directed forces lead to outwardly directed forces acting upon the inner wall of the housing and consequently producing a large friction force to prevent a twisting and a shifting.

Each rubber portion 28 is provided with a rounded recess 30, whilst each rubber portion 29 is provided with a rounded projection 31 fitting into the recess 30. In this way the segments 26 hingedly engage each other so that the same segments may be applied in housings of different diameters as shown in the FIGS. 3 and 4 for a slide bearing with a small and a large diameter respectively, so as in the first case a gap angle α at the outer side and in the second case a gap angle α at the inner side is formed. However, said gap angles α are entirely or almost entirely annulled in tightening the precompressing ring.

The segments 26 may bear against the wall of the housing with one or more cushions 32 made of rubber, which cushions easily may adapt to the predetermined diameter of the housing.

A plurality of segments 25 may be arranged behind each other longitudinally in the housing in side by side relation or like the bricks in a brickwork.

The bearing construction according to the invention as shown in FIG. 5 corresponds substantially with that according to FIGS. 3 and 4. However, in the construction according to FIG. 5 the recesses in the segments 33 are formed in that angle portions of said segments are taken away so that the recesses are bounded by an axial and an approximately tangential surface and the rubber portions 34 and 35 extend up to the outer side of the segments 33.

In this embodiment a tangential as well as a radial expansion of the rubber portions occur as a result of the axial precompressing force produced by means of the precompressing ring. Both components of said expansion will tend to a firm fastening in the housing, but the tangential component the most. However, after the fastening the radial component especially will lead to a decrease of the diameter of the race. Herewith a certain adjustability of the diameter of the bearing is to be obtained within certain predetermined limits through which along with maintaining a very exact bearing tolerance also a readjustment after an occurrance of wear of the bearing is possible which readjustment is achieved by further tightening the precompressing ring.

Moreover, the construction according to FIG. 5 allows a certain resilient compression and tilting of the bearing segments 33, so that a possible shifting of the centre of the shaft and also a tilting in the longitudinal direction of the shaft can be taken up and thereby edge-pressures may be reduced or even practically avoided. Said extra deformation of the rubber portions are attended with an increase of the tightening pressure upon the wall of the housing which consequently is a favourable effect.

The occurring resilient compression and tilting movements are besides a function of the introducing loads also a function of the hardness of the rubber or the similar material and therefore may be adjusted to each other.

Also in the construction according to FIG. 5 the race 36 may consist of any suitable material whilst also a plurality of segments 33 may be arranged behind each other in longitudinal direction in side by side relation or like the bricks in a brickwork.

The rubber portions 34 and 35 are provided with a rounded projection 37 and a rounded recess 38 respectively.

I claim:

1. A method of making a slide bearing having a race and a housing, comprising: introducing into said housing with a radial clearance at least one element made of rubber material or the like and having projections extending therefrom, and closing said clearance by pressing said projections inwardly into said housing to thereby expand said projections; and holding said projections in expanded condition.

2. A method according to claim 1, wherein said projections are expanded radially.

3. A method according to claim 1, in which said projections are expanded tangentially.

4. A method according to claim 1, in which said projections are expanded radially and tangentially.

5. A slide bearing comprising: a housing, a race placed in said housing with radial clearance, at least one element made of rubber or rubber-like material interposed between said race and said housing, and means for compressing said material axially to close said radial clearance to thereby connect said race to said housing.

6. A slide bearing according to claim 5, wherein said race comprises a plurality of segments disposed in abutting relationship to each other, a plurality of recesses being provided in said segments, the recess in one segment facing a recess in an adjacent segment, and a plurality of said elements being provided in said recesses and separating said segments.

7. A side bearing according to claim 6, wherein adjacent elements have complimentary surfaces engaging each other, one of said elements being provided with a rounded protrusion, the adjacent element being provided with a complimentary rounded cavity.

8. A slide bearing according to claim 6, wherein the recesses in each segment comprise a substantially radially extending surface and a substantially tangentially extending surface, said elements in said recesses extending to the outer circumferential surface of the respective segment.

* * * * *

UNITED STATES PATENT AND TRADEMARK OFFICE
CERTIFICATE OF CORRECTION

PATENT NO. : 4,134,194
DATED : January 16, 1979
INVENTOR(S) : Jan N. H. Loggers

It is certified that error appears in the above-identified patent and that said Letters Patent are hereby corrected as shown below:

[73]     Assignee:   Houdstermaatschappij Alex A.
                    Loggers B.V., Dordrecht, Netherlands Signed and Sealed this Fifteenth Day of May 1979

[SEAL]

Attest:

RUTH C. MASON
Attesting Officer

DONALD W. BANNER
Commissioner of Patents and Trademarks